Patented Oct. 17, 1939

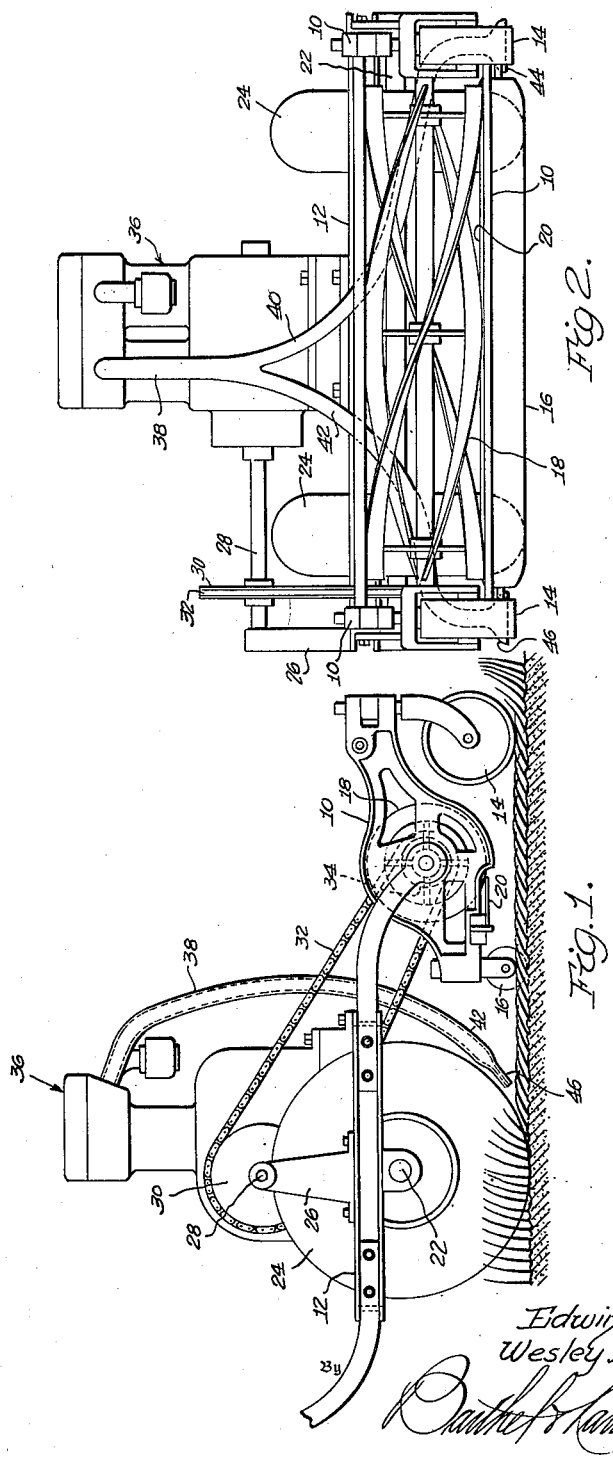

2,176,175

UNITED STATES PATENT OFFICE 2,176,175

LAWN MOWER

Edwin S. George, Bloomfield Hills, and Wesley A. Gibbons, Birmingham, Mich., assignors to The Moto-Mower Company, Detroit, Mich., a corporation of Michigan Application October 20, 1938, Serial No. 235,952

3 Claims. (Cl. 56—26)

This invention relates, in general, to improvements in lawn mowers and, in particular, to mowers of the power driven type.

One fault inherent in the use of power driven mowers, which are usually employed in heavy duty mowing, is that the grass tracked down by the ground-bearing members of the mower is left uncut. Therefore, to correct for this, the main object of the invention is to improve a power driven mower so that the grass tracked down by the ground-bearing members of the mower is as uniformly cut by the cutting members of the mower as is the lawn as a whole.

More specifically, an object of the invention is to provide a power driven lawn mower with pneumatic means whereby the grass tracked down by the ground-bearing members of the mower is upraised to permit uniform cutting thereof by the cutting members of the mower.

Other objects and advantages of the invention will become readily apparent from a reference to the following specification taken in conjunction with the accompanying drawing in which:

Figure 1 is a side elevation of a power driven mower and showing details of the invention incorporated therein; and Fig. 2 is a front elevation of the showing in Fig. 1.

The mower of Figs. 1 and 2, which may be of the form shown in our co-pending application, Serial No. 213,380, filed June 6, 1938, and entitled "Lawn mowers", comprises fore and aft frame structures 10 and 12 of the usual construction and which are hinged, pivoted, or otherwise interconnected for the ordinarily desirable relative movement therebetween. As is customary, the fore frame structure 10 supports at or near its forward end a pair of spaced, ground-engaging wheels or casters 14 adapted for swivelled movement relatively to said structure and at or near its rearward end a ground-engaging roller 16. As is also customary, a cutting reel 18 is rotatably carried by the frame structures 10 and 12 at the interconnection thereof, said reel being supported ahead of and in close proximity to the usual cutting bar 20 carried by the frame structure 10 ahead of the roller 16, said reel also being disposed behind the wheels or casters 14 and therebetween.

The aft frame structure 12 of the mower is shown, as usual, supporting a shaft 22 on which is mounted intermediate its ends and for rotation therewith a pair of spaced, ground-engaging wheels 24. A boss 26 is provided on one side of the frame structure 12 and forms a bearing for one end of a shaft 28 on which is mounted for rotation therewith a pulley or sprocket wheel 30. Pulley or wheel 30 is operable for driving the cutting reel 18 by means of a belt or chain drive 32 which is in driven connection with a pulley or sprocket wheel 30 and in driving connection with a pulley or sprocket wheel 34 mounted on and for rotation with said reel at one side of the cutting members thereon.

For driving the mower itself and the reel 18 thereof, an internal combustion engine, generally indicated at 36, is employed and is supported on the aft frame structure 12 between the wheels 24. By the employment of the usual clutches and mechanical connections (not shown) the engine 36 is operatively associated with the shafts 22 and 28 for rotatably driving said shafts, preferably individually and independently, so that rotation of shaft 22 will carry the mower on the wheels 24 across the lawn to be cut, and rotation of shaft 28 will rotatably drive the reel 18 through the belt or chain drive 32 and the pulleys or sprocket wheels 30 and 34.

The exhaust gases or a portion thereof are directed from the engine 36 by means of a properly supported, branched pipe or conduit 38, each of the branches 40 and 42 of pipe 38 being laterally outwardly and downwardly led so that the dovetailed outlets 44 and 46 thereof adjacently overlie the paths of crushed or tracked-down grass made by the ground travel of the wheels or casters 14. Since the width of the outlets 44 and 46 are at least as great as the width of said paths, and since the gases emitted therefrom travel in a direction counter to the pointing direction of the crushed grass, said crushed grass in its entirety is replaced in a substantially perpendicular position to permit the subsequent and uniform cutting thereof. The fact that the outlets 44 and 46 are dovetailed not only renders high velocity to the emitted gases but it muffles them as well. Naturally only those tracks caused by the wheels or casters 14 are considered since the latter are the only ground-engaging members on the ordinary mower which both lead and laterally overlie the cutting reel, but similar provision is contemplated for other laterally overlying ground-engaging members of the mower whether same lead or follow said reel.

Although the invention has been described with some detail it is not intended that such description is to be definitive of the limits of the inventive idea. The right is reserved to make such changes in the details of construction and arrangement of parts as will come within the purview of the attached claims.

What we claim is:

1. In a lawn mower having an engine for motivating same over the lawn to be cut and an exhaust, an elongated cutting reel rotatably driven by the engine, a pair of ground engaging members supporting said reel in cutting engagement with the lawn and spaced from each other in outwardly offset relationship to the ends of said reel, a pair of conduits in communication with the exhaust from the engine, and an outlet on each of said conduits for the exhaust therein, said outlets being arranged behind said members and spaced from each other similarly as said members with said reel between said outlets.

2. In a lawn mower having an engine for motivating same over the lawn to be cut and an exhaust, an elongated cutting reel rotatably driven by the engine for cutting a predetermined width of lawn, a pair of ground engaging members supporting said reel in cutting engagement with the lawn and laterally outwardly spaced from the opposite edges of said width, a pair of conduits in communication with the exhaust from the engine, and an outlet on each of said conduits for the exhaust therein, said outlets being arranged behind said members and spaced from each other similarly as said members with said reel between said outlets.

3. In a lawn mower having an engine for motivating same over the lawn to be cut and an exhaust, an elongated cutting reel of predetermined length and rotatably driven by the engine for cutting a strip of lawn of a width equal to said length, a pair of ground engaging members supporting said reel in cutting engagement with the lawn and spaced from each other a distance greater than said length, said members being arranged marginally outwardly of the strip and on opposite sides thereof, a pair of conduits in communication with the exhaust from the engine, and an outlet on each of said conduits for the exhaust therein, said outlets being spaced from each other similarly as said members and arranged directly above the tracks made by said members in the lawn offset from the strip.

EDWIN S. GEORGE.
WESLEY A. GIBBONS.